Patented Apr. 1, 1952

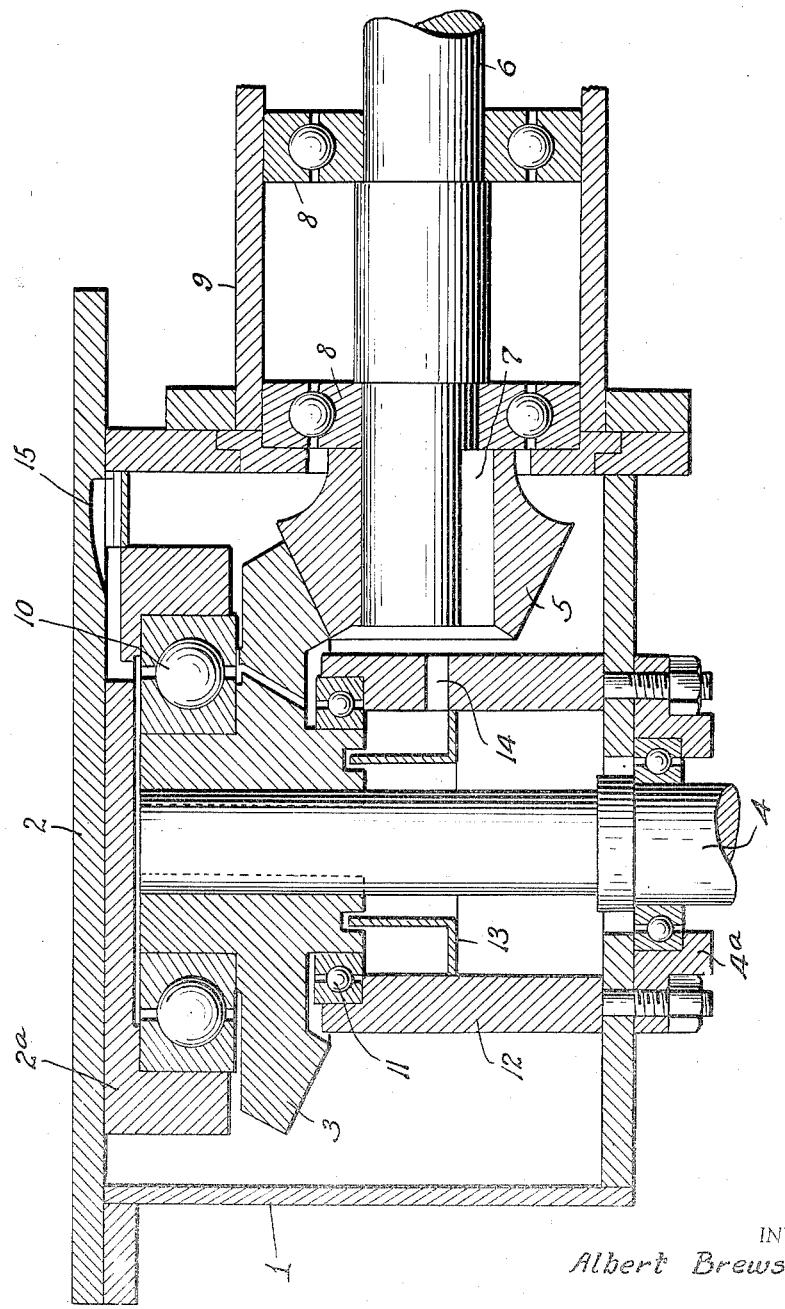

2,591,127

UNITED STATES PATENT OFFICE 2,591,127

GEAR BOX

Albert Brewster, Bowling Green, Mo., assignor of one-fourth to John M. Rutter and one-fourth to Frank W. Fitzgerald, Sr., both of Bowling Green, and one-fourth to Chester L. Davis, Perry, Mo.

Application May 1, 1950, Serial No. 159,247

2 Claims. (Cl. 74—417)

1

My invention relates to a gear box of improved design and more particularly to a gear box whereby driving and driven shafts are in vertical and horizontal planes.

An object of my invention is to provide a right angle gear box where a driving or driven shaft extends from the bottom of said gear box and a novel construction whereby lubricant within said gear box is prevented from leaking therefrom.

Other and further objects and advantages of my invention will appear from the specification to follow and from the accompanying drawing which shows a suitable construction embodying the features of my invention.

It has long been known that gear boxes are difficult to lubricate and retain their lubrication and this is especially true where a driving or a driven shaft extends from the bottom of the gear box. The problem of an effective oil-seal is ever troublesome and the practice has been to employ packing of felt or fibre washers at the place where the shaft emerges from the box. The problem is not difficult of some degree of solution where the driving and driven shafts enter and leave the gear box within one or more horizontal planes, it being possible in such cases to keep the oil level above the entrance or exit points. This arrangement is not possible however where the driving shaft or the driven shaft extends from the bottom of the box.

From the drawing it will be observed that I provide a box 1 to which is secured a top or lid 2. Within the box 1, I provide a ring-gear 3 secured to the upper end of a vertical shaft 4 by means of splines. In the bottom of box 1 where shaft 4 emerges I provide a bearing and support assembly 4a which is illustrated merely to show an operative structure, the support for the lower end of the shaft 4 usually being the driving or driven mechanism, not shown, and making unnecessary the bearing assembly 4a.

Through the side of box 1 a driving or driven shaft 6 is provided, on the inner end of which a pinion-gear 5 is secured by means of key 7. As illustrated pinion-gear 5 and ring-gear 3 are shown in section as is further true of most of the parts shown in the drawing. Gears 5 and 3 are in mesh. Shaft 6 is shown supported in split-bearings 8, the inner half of the race being secured to shaft 6 and the outer half being supported in a bearing plate assembly 9 secured to the end of box 1 by welding. Of course the assembly 9 can be cast as an integral part of box 1.

Secured to or formed as an integral part of lid 2 is a supporting bearing plate assembly 2a to

2 which is secured the outer section of a split bearing race 10, the inner section being secured to the hub of ring-gear 3. A hub on the bottom of ring-gear 3 carries the inner section of another split bearing race 11, the outer section being carried by a cylindrically shaped standard 12. A second cylindrically shaped member 13 surrounds shaft 4 and is within standard 12, member 13 having an out-turned flange extending to the inner wall of standard 12 and constituting an oil shelf, as will be more fully described later. The upper end of cylindrical member 13 extends into an annular groove in the bottom of ring-gear 3.

Next will be described the path of oil circulation, the manner in which it is directed, the location and extent of the ducts, the reservoir and the unique structural details that make possible my invention of an improved gear box.

The main reservoir for oil is the lower part of an annular shaped space between the inner wall of box 1 and the outside wall of cylindrical shaped standard 12 and when the mechanism is static the level of the oil would normally be over the lower edge of pinion-gear 5. No oil would be present within the space between the inner wall of cylindrical shaped standard 12 and shaft 4 regardless of whether the mechanism is in motion or stationary. In operation, the teeth of pinion-gear 5 carries oil upward to the teeth of ring-gear 3 and part of the carried oil is thrown to the top of box 1, touching the lid 2 and into the inclined directing area 15. It will be observed that the teeth of pinion-gear 5 are of greater length than are the teeth of ring-gear 3 and the oil that is not carried by contact to the teeth of gear 3 has a tendency of course to leave gear 5 at the outer edge of the teeth. The oil thrown from the teeth of gear 5, having been caught by directing area 15 of lid 2 naturally flows downward into an oil channel at the top of bearing race 10. The balls within bearing race 10 are in motion and the oil leaves the bottom of race 10 passing into oil passages drilled through ring-gear 3. These oil passages through gear 3 are distributed the same distance from the periphery and are sufficient in number to carry only the necessary quantity of oil for the further lubricating of parts to be later described. This restriction is important and it is to be understood that the exact calculation of the size and number of the passages through gear 3 will depend upon the dimensions of the overall design of the gears 3 and 5, and the speed of their rotation.

The lubricant, after so restricted in its passage through gear 3, passes next to split-bearing race 11 and to the top edge of cylindrically shaped standard 12. From the top of standard 12 and between this and the lower side of gear 3, I provide a passage-way for the oil to drain back along the end of pinion-gear 5 and the reservoir proper. A greater restriction is provided near the bottom of split-bearing race 11 so that most of the oil takes the course over the top of standard 12. What oil does emerge along the bottom of gear 3 and the lower part of split-bearing race 11 is caught by the angular shelf 13 from where it drains through apertures 14 in standard 12 returning to the reservoir. An important feature is the annular groove in the bottom side of gear 3 into which the top edge of shelf 13 extends. It is of course obvious that this groove could take the form of an extended rim overhanging along the inner side of the top edge of shelf 13, since when gear 3 is in motion the centrifugal force would carry the oil outward and it would leave gear 3 at the lowest and most distant area from the shaft 4. It can thus be seen that there would be no oil on the bottom of gear 3 other than that near the split-bearing race 11 and for a short distance therefrom, this distance determining the location of the shelf 13. It further is important to move the upper edge of shelf 13 nearer the shaft 4 as the speed of shaft rotation is reduced because then the centrifugal force would be less. It is also apparent that there would be no creeping of the oil toward the shaft 4 when the mechanism is stationary because the groove and upper edge of shelf 13 would afford a drainage path for the oil and it would not creep toward shaft 4 along the bottom of gear 3, this being a dry surface.

It may be possible that structural changes and modifications of the arrangement I have shown and described are possible to achieve the improved results of my invention without departing from the spirit of my invention, and without departing from the scope of the following claims. What I claim for my invention is:

1. A gear box assembly comprising in combination a box having a removable lid, said lid carrying on the under side thereof a split-bearing race, a shaft extending through the bottom of said box on the upper end of which is secured a gear, a second shaft extending through one side of said box on the inner end of which a second gear is secured which is in mesh with said first mentioned gear, said first mentioned gear having an upper boss engaging with said split-bearing race, apertures within said first mentioned gear positioned directly under said split-bearing race, said first mentioned gear having a boss on the under side thereof, a cylindrical shaped standard positioned within said box concentrically with said first mentioned shaft and spaced therefrom, a second split-bearing race carried by said standard and intermediate said standard and the boss on the underside of said first mentioned gear, apertures through said standard, an annular member having an upturned rim and said member secured to the inner side of said standard intermediate said apertures and the bottom of said box.

2. A gear box comprising in combination a housing having a side and a bottom, a horizontally located shaft entering said side and having a gear secured to the inner end thereof, a vertically located shaft entering said bottom and having a gear secured to the inner end thereof, said gears in mesh, said gear secured to the vertically located shaft having a central hub section, a radial groove within said hub section on the under side thereof, a complementary flange extending within said groove and secured to said housing, a bearing assembly and support therefor located within said housing, said bearing assembly engaging with said hub section and located a greater distance radially from said shaft than is located said groove.

ALBERT BREWSTER.

REFERENCES CITED

The following references are of record in the file of this patent:

UNITED STATES PATENTS

| Number | Name | Date |
| --- | --- | --- |
| 1,502,083 | Zoelly | July 22, 1924 |
| 1,824,409 | Ruttiman | Sept. 22, 1931 |
| 1,853,942 | Sturtevant | Apr. 12, 1932 |
| 2,454,868 | Gibson et al. | Nov. 30, 1948 |
| 2,486,477 | Kennedy | Nov. 1, 1949 |
| 2,517,913 | Nickle | Aug. 8, 1950 |

FOREIGN PATENTS

| Number | Country | Date |
| --- | --- | --- |
| 884,461 | France | Aug. 18, 1943 |